US009494955B2

(12) United States Patent
Hess et al.

(10) Patent No.: US 9,494,955 B2
(45) Date of Patent: Nov. 15, 2016

(54) METHOD FOR CONTROLLING A HEAT-GENERATING ELEMENT

(71) Applicant: Dimplex North America Limited, Cambridge (CA)

(72) Inventors: Kristoffer Hess, Cambridge (CA); Kelly Stinson, Cambridge (CA)

(73) Assignee: Dimplex North America Limited, Cambridge, Ontario (CA)

( * ) Notice: Subject to any disclaimer, the term of this patent is extended or adjusted under 35 U.S.C. 154(b) by 397 days.

(21) Appl. No.: 14/353,656

(22) PCT Filed: Oct. 31, 2012

(86) PCT No.: PCT/CA2012/001016
§ 371 (c)(1),
(2) Date: Apr. 23, 2014

(87) PCT Pub. No.: WO2013/063691
PCT Pub. Date: May 10, 2013

(65) Prior Publication Data
US 2015/0028115 A1    Jan. 29, 2015

Related U.S. Application Data
(60) Provisional application No. 61/553,659, filed on Oct. 31, 2011.

(51) Int. Cl.
*G05D 23/32*    (2006.01)
*G05D 23/19*    (2006.01)
(Continued)

(52) U.S. Cl.
CPC ............. *G05D 23/32* (2013.01); *F24H 3/0411* (2013.01); *F24H 9/2071* (2013.01);
(Continued)

(58) Field of Classification Search
CPC ................ F24H 3/0411; F24H 9/2071; G05D 23/32; G05D 23/1919; G05D 23/1904; H05B 1/028; F24D 2220/2072
(Continued)

(56) References Cited

U.S. PATENT DOCUMENTS 4,388,692 A * 6/1983 Jones .................... F24F 11/0009
                                                 165/238
4,483,388 A * 11/1984 Briccetti ................ F24F 1/0003
                                                 165/232
(Continued)

FOREIGN PATENT DOCUMENTS

CA        2590028 A1    11/2007
DE        2358379 A1    5/1975
(Continued)

OTHER PUBLICATIONS

English translation of Abstract for JP03203184.
(Continued)

*Primary Examiner* — Mohammad M Ali

(57) ABSTRACT

A method of controlling a heat-generating element that generates heat when electric current is passed therethrough to control an ambient temperature within a space in which a sensor for sensing temperatures is at least partially located. The method includes sensing an initial temperature, and permitting passage of the electric current through the heat-generating element at 100 percent output for a preselected initial time period. After the electric current has passed through the heat-generating element for the preselected initial time period, a second temperature is sensed. A first temperature difference between the initial temperature and the second temperature is determined. A maximum error between a sensed temperature sensed at a selected time after the initial time period, and the ambient temperature at the
(Continued)

selected time, is determined in accordance with a predetermined relationship between the first temperature difference and the maximum error.

29 Claims, 15 Drawing Sheets

(51) Int. Cl.
  *H05B 1/02* (2006.01)
  *F24H 3/04* (2006.01)
  *F24H 9/20* (2006.01)
(52) U.S. Cl.
  CPC ...... *G05D 23/1904* (2013.01); *G05D 23/1919* (2013.01); *H05B 1/028* (2013.01); *F24D 2220/2072* (2013.01)
(58) Field of Classification Search
  USPC .................. 62/157, 158; 236/68 B, 78 R
  See application file for complete search history.

(56) References Cited

U.S. PATENT DOCUMENTS

| | | | |
|---|---|---|---|
| 5,144,814 A | 9/1992 | Gaudette | |
| 5,199,637 A | 4/1993 | Adams | |
| 5,245,693 A * | 9/1993 | Ford | A61M 5/44 165/169 |
| 5,278,936 A | 1/1994 | Shao | |
| 5,482,013 A * | 1/1996 | Andrews | F02M 31/042 123/179.21 |
| 6,380,861 B2 * | 4/2002 | Estelle | B05C 5/001 340/588 |
| 7,018,114 B2 * | 3/2006 | Stewart | G05D 23/1919 372/34 |
| 8,008,604 B2 * | 8/2011 | Tsang | F24C 7/105 219/494 |
| 2006/0006167 A1 * | 1/2006 | Kopel | F24H 9/2071 219/494 |
| 2007/0095126 A1 * | 5/2007 | Bailey | G01N 30/88 73/23.35 |
| 2007/0242726 A1 * | 10/2007 | Medero | G01K 7/42 374/164 |
| 2007/0278202 A1 * | 12/2007 | Long | A47J 31/20 219/214 |
| 2008/0083834 A1 * | 4/2008 | Krebs | B60H 1/00892 237/2 A |
| 2009/0127347 A1 * | 5/2009 | May | F24D 5/02 237/2 R |

FOREIGN PATENT DOCUMENTS

| | | |
|---|---|---|
| JP | 63173669 A | 7/1988 |
| JP | 03203184 A | 9/1991 |
| WO | PCT/CA2012/001016 | 10/2012 |
| WO | WO2013063691 A1 | 5/2013 |

OTHER PUBLICATIONS

English translation of Abstract for JP63173669.
Machine-generated English translation of description and claims for DE2358379.

\* cited by examiner

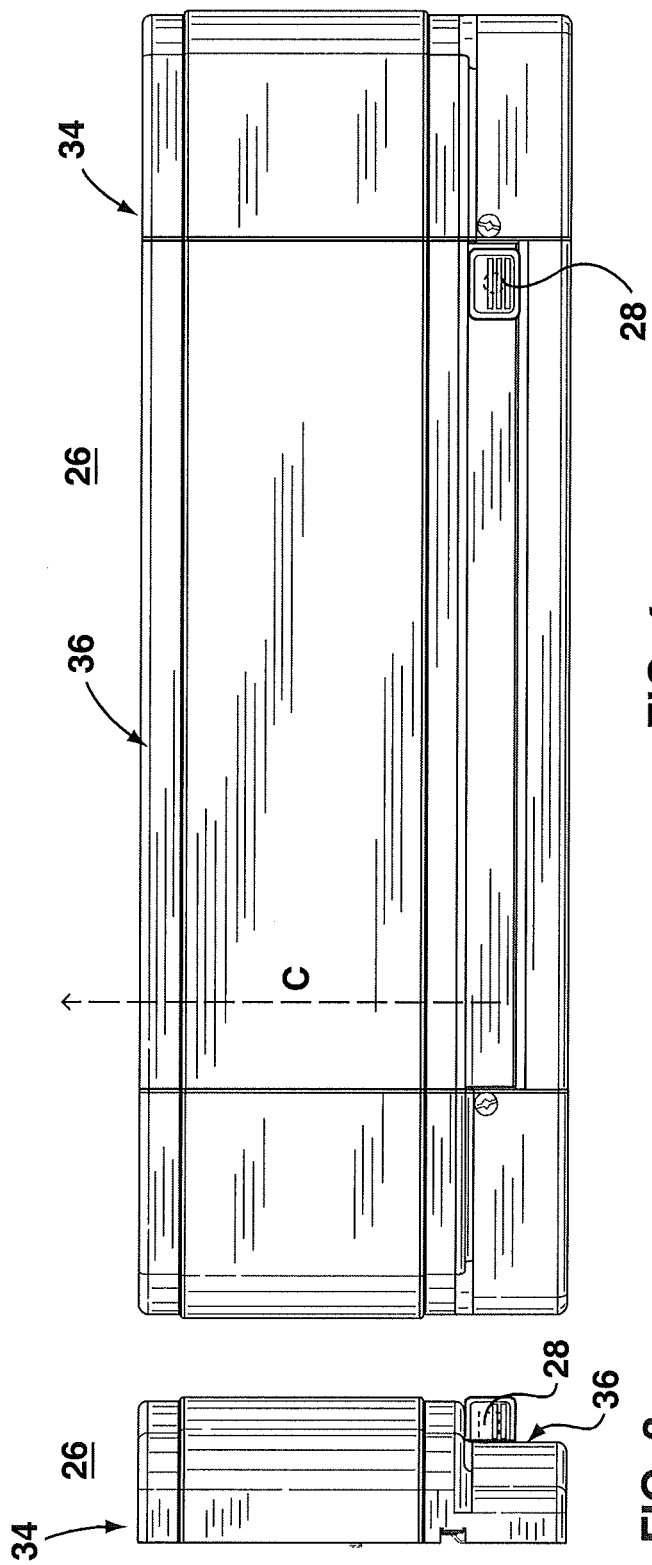

METHOD FOR CONTROLLING A HEAT-GENERATING ELEMENT

CROSS REFERENCE

This application is the national stage entry of PCT/CA2012/001016, filed on Oct. 31, 2012, which claims priority to U.S. Provisional Application 61/553,659, filed on Oct. 31, 2011, the entirety of which is incorporated herein by reference. All claims of priority to these applications are hereby made.

FIELD OF THE INVENTION

The present invention is a method for controlling a heat-generating element that generates heat when electric current is passed therethrough to control an ambient temperature within a space in which a sensor for sensing temperatures is at least partially located.

BACKGROUND OF THE INVENTION

As is well known in the art, Joule heating (also referred to as ohmic heating or resistive heating) can cause errors in determining an ambient temperature, for instance, where the ambient temperature of a space is to be controlled. For example, Joule heating of electronic components in a thermostat can adversely affect the determination, by the thermostat, of the ambient temperature of the space in which the thermostat is located.

In the prior art, attempts to solve this problem typically involve an assumption that, for a particular product (e.g., a particular thermostat), there is a maximum offset (i.e., at a duty cycle of 100%) between a sensed or measured temperature and the actual ambient temperature. That is, in the prior art, it is assumed that, for a particular product, the maximum offset does not vary. The assumed maximum offset is typically based on test results for the product resulting from laboratory testing. In the prior art, an adjustment is made to the assumed maximum offset, to take into account the duty cycle, in an attempt to determine the actual ambient temperature by subtracting an adjusted offset from the measured temperature.

The duty cycle is taken into account because, as is well known in the art, the error in determining the actual ambient temperature is proportional to the duty cycle. Therefore, the assumed maximum offset typically is proportionally reduced, to provide the adjusted offset. In practice, this means that the maximum offset typically is adjusted by the applicable duty cycle by multiplying the maximum offset by the duty cycle, where the duty cycle is expressed as a percentage. Ultimately, the product typically is energized for what is thought to be a correct period of time, largely based on the difference between the approximate ambient temperature (as calculated based on the foregoing assumption) and the set point temperature.

Because the maximum offset is determined in the prior art in factory conditions, the environment around the product upon its installation is not taken into account. However, assuming the same maximum offset in all circumstances for a particular product can lead to significant inaccuracies, because the environment in proximity to the product significantly affects the circulation of air in the space. The failure in the prior art to take the immediate environment into account introduces a significant error into the determination of the maximum offset. As noted above, the estimated or approximate ambient temperature typically is determined by calculations based on the maximum offset. Accordingly, it can be seen that an error in the maximum offset (i.e., a maximum offset that does not take the environment around the product into account) will result in an inaccurate estimate of the ambient temperature. This has a direct impact on the ability of the prior art product to operate properly and efficiently.

In addition, the environment around the product may change significantly from time to time, e.g., when nearby furniture is moved, or if the product is moved. For example, if a large item of furniture is pushed against the product (e.g., a baseboard heater) and remains positioned against it, the furniture significantly affects the circulation of air in the space, in and around the product. In this example, because of the changed air circulation pattern, the maximum offset should be affected by the furniture pushed against the product. The effect of a change in the environment around the product may be difficult to predict. In general, because the role environment plays in the determination of an accurate maximum offset is significant, assuming a maximum offset for a particular product that fails to take the environment around the product into account leads to an inaccurate estimate of the ambient temperature, and improper and inefficient operation of the product.

SUMMARY OF THE INVENTION

For the foregoing reasons, there is a need for a method and a system of controlling a heat-generating element that overcomes or mitigates one or more of the disadvantages of the prior art.

In its broad aspect, the invention provides a method of controlling a heat-generating element that generates heat when electric current is passed therethrough to control an ambient temperature within a space in which a sensor for sensing temperatures is at least partially located. The method includes sensing an initial temperature, and then permitting passage of the electric current through the heat-generating element at 100 percent output for a preselected initial time period. After the electric current has passed through the heat-generating element for the preselected initial time period, a second temperature is sensed. Next, a first temperature difference between the initial temperature and the second temperature is determined. Finally, a maximum error is determined between (i) a sensed temperature sensed at a selected time after the initial time period, and (ii) the ambient temperature at the selected time, in accordance with a predetermined relationship between the first temperature difference and the maximum error.

In another aspect, the method includes multiplying the maximum error by a preselected output proportion to determine a modified error, and then subtracting the modified error from the sensed temperature to determine an estimated ambient temperature at the selected time. Next, the estimated ambient temperature is subtracted from a predetermined set point temperature to determine a second temperature difference at the selected time. A calculated output proportion is calculated based on a selected relationship between the second temperature difference and the calculated output proportion. Finally, passage of the electric current through the heat-generating element at the calculated output proportion is permitted.

In another of its aspects, the invention provides a method including sensing an initial temperature, permitting passage of the electric current through the heat-generating element at 100 percent output for a preselected initial time period, and, after the electric current has passed through the heat-generating element for the preselected initial time period, sensing a second temperature. Next, a first temperature difference is determined between the initial temperature and the second temperature, and then a calculated maximum error is determined between (i) a sensed temperature sensed at a selected time after the initial time period, and (ii) the ambient temperature at the selected time, in accordance with a predetermined relationship between the first temperature difference and the calculated maximum error. A modified maximum error that is based on a preselected relationship between the calculated maximum error and the modified maximum error is determined. The maximum error is then multiplied by a preselected output proportion to determine a modified error, and the modified error is subtracted from the sensed temperature to determine an estimated ambient temperature at the selected time. Next, the estimated ambient temperature is subtracted from a predetermined set point temperature to determine a second temperature difference at the selected time, and then a calculated output proportion is calculated based on a selected relationship between the second temperature difference and the calculated output proportion. Finally, passage of the electric current is permitted through the heat-generating element at the calculated output proportion.

In another aspect, the method includes, first, determining whether at least one predetermined precondition is satisfied, and if said at least one predetermined precondition is satisfied, sensing an initial temperature. Next, passage of the electric current is permitted through the heat-generating element at 100 percent output for a preselected initial time period, and after the electric current has passed through the heat-generating element for the preselected initial time period, a second temperature is sensed. A first temperature difference is determined between the initial temperature and the second temperature. Next, a calculated maximum error is determined between (i) a sensed temperature sensed at a selected time after the initial time period, and (ii) the ambient temperature at the selected time, in accordance with a predetermined relationship between the first temperature difference and the calculated maximum error.

In yet another aspect, the method includes determining whether, during a first predetermined time period, the electric current passed through the heat-generating element, and also determining whether, during a first predetermined temperature stability check time period concurrent and coterminous with the first predetermined time period, the temperatures sensed by the sensor are substantially stable. If the electric current has not passed through the heat-generating element during the first predetermined time period and if the temperatures sensed by the sensor during the first predetermined temperature stability check time period are substantially stable, an initial temperature is sensed. If the initial temperature is less than a set point temperature, with a microprocessor, passage of the electric current is permitted through the heat-generating element at 100 percent output for a preselected initial time period. After the electric current has passed through the heat-generating element for the preselected initial time period, a second temperature is sensed. Then a first temperature difference is determined between the initial temperature of the sensor and the second temperature thereof. Next, a calculated maximum error is determined between (i) a sensed temperature of the space sensed at a selected time after the initial time period, and (ii) the ambient temperature at the selected time, in accordance with a predetermined relationship between the first temperature difference and the calculated maximum error. A modified maximum error that is based on a preselected relationship between the calculated maximum error and the modified maximum error is determined. The modified maximum error is multiplied by a preselected output proportion to determine a modified error. The modified error is subtracted from the sensed temperature to determine an estimated ambient temperature at the selected time. The estimated ambient temperature is subtracted from the set point temperature to determine a second temperature difference at the selected time. Next, a calculated output proportion is calculated based on a selected relationship between the second temperature difference and the calculated output proportion. Finally, passage of the electric current through the heat-generating element at the calculated output proportion is permitted.

In another aspect, the invention provides a system for controlling an ambient temperature within a space. The system includes a heat-generating element that generates heat when electric current is passed therethrough, a sensor at least partially located in the space, for sensing temperatures, and a microprocessor configured to initiate calibration of the system by causing the sensor to sense an initial temperature. The microprocessor is configured to permit the electric current to pass through the heat-generating element at 100 percent output for a preselected initial time period. In addition, the microprocessor is configured to cause the sensor to sense a second temperature, when the initial time period ends. The microprocessor is further configured:
  to determine a first temperature difference between the initial temperature and the second temperature; and
  to determine a maximum error between:
    a sensed temperature of the space, sensed at a selected time after the initial time period,
    the ambient temperature at the selected time,
    the maximum error being determined according to a predetermined relationship between the first temperature difference and the maximum error.

In another of its aspects, the invention provides a controller assembly for controlling a heat-generating element that generates heat when electric current is passed therethrough to control an ambient temperature within a space. The controller assembly includes a sensor at least partially located in the space, for sensing temperatures, and a microprocessor configured to initiate calibration of the system by causing the sensor to sense an initial temperature. The microprocessor is configured to permit the electric current to pass through the heat-generating element at 100 percent output for a preselected initial time period. In addition, the microprocessor is further configured to cause the sensor to sense a second temperature, when the initial time period ends. The microprocessor is further configured:
  to determine a first temperature difference between the initial temperature and the second temperature; and
  to determine a maximum error between:
    a sensed temperature of the space, sensed at a selected time after the initial time period,
    the ambient temperature at the selected time,
    the maximum error being determined according to a predetermined relationship between the first temperature difference and the maximum error.

BRIEF DESCRIPTION OF THE DRAWINGS

The invention will be better understood with reference to the attached drawings, in which:

FIG. 1B-2 is a flow chart also partially illustrating the embodiment of the method of FIG. 1B-1;

FIG. 1C-1 is a flow chart partially schematically illustrating another embodiment of the method of the invention;

FIG. 1C-2 is a flow chart also partially illustrating the embodiment of the method of FIG. 1C-1;

FIG. 1D-1 is a flow chart partially schematically illustrating another embodiment of the method of the invention;

FIG. 1D-2 is a flow chart also partially illustrating the embodiment of the method of FIG. 1D-1;

FIG. 1E-1 is a flow chart partially schematically illustrating another embodiment of the method of the invention;

FIG. 1E-2 is a flow chart also partially illustrating the embodiment of the method of FIG. 1E-1;

FIG. 2 is an isometric view of an embodiment of a baseboard heater including a system of the invention;

FIG. 3 is a side view of the baseboard heater of FIG. 2;

FIG. 4 is a front view of the baseboard heater of FIG. 2;

DETAILED DESCRIPTION

Figure 6:
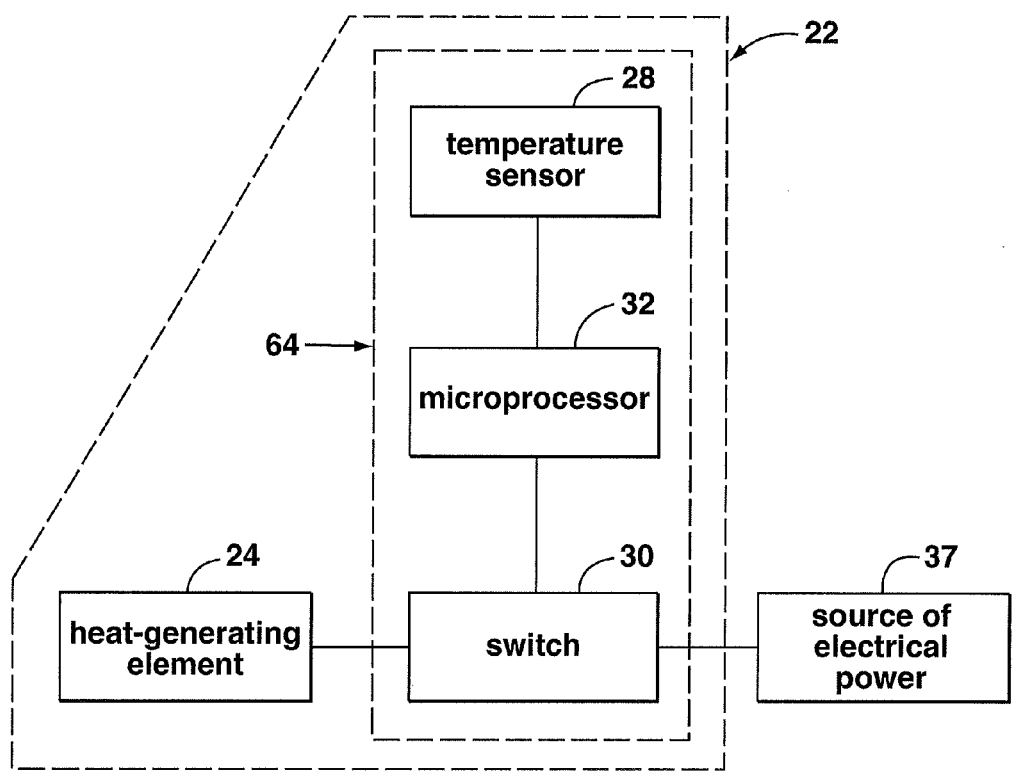
FIG. 6 is a block diagram of an embodiment of a system of the invention.

In the attached drawings, like reference numerals designate corresponding elements throughout. Reference is made to FIGS. 1A-8 to describe an embodiment of a method of the invention referred to generally by the numeral 20 and an embodiment of a system 22 of the invention (FIG. 6). In one embodiment, the system 22 preferably includes a heat-generating element 24 that generates heat when electric current is passed therethrough, to control an ambient temperature within a space 26. As will be described, the system 22 preferably also includes a sensor 28 for sensing temperatures, a switch 30 to control passage of the electric current through the heat-generating element 24, and a microprocessor 32 for opening and closing the switch 30.

Figure 1A:
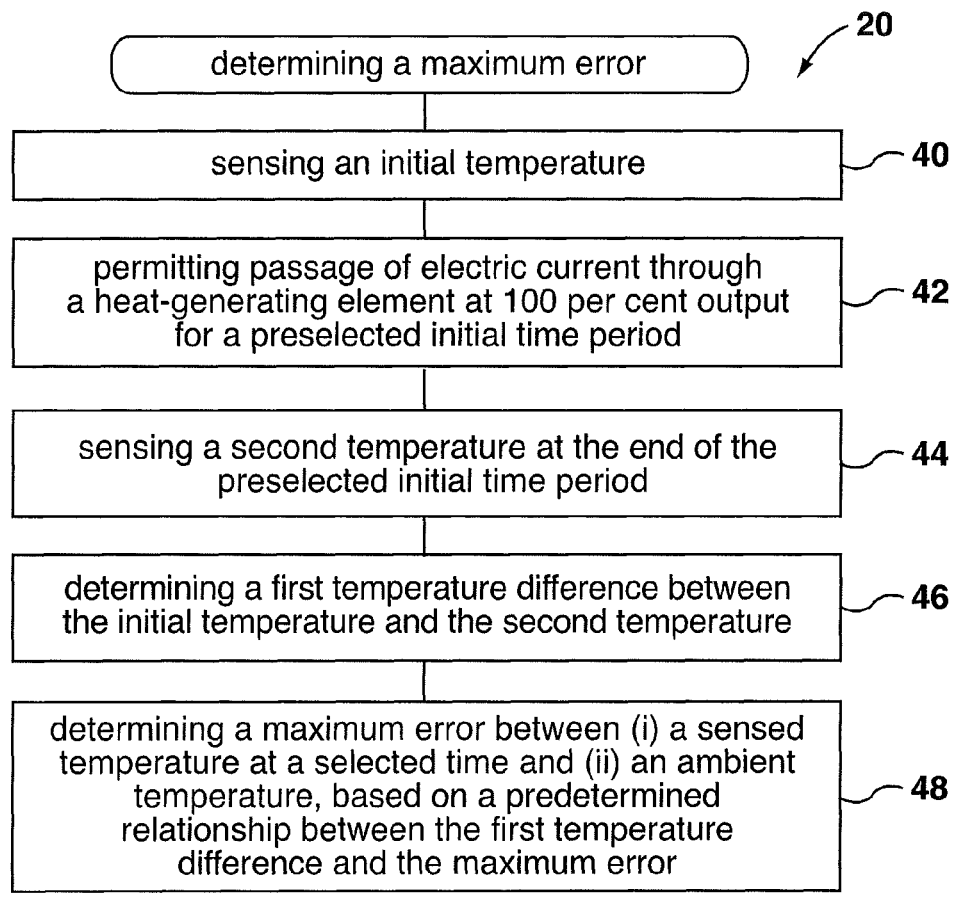
FIG. 1A is a flow chart schematically illustrating an embodiment of a method of the invention.

In FIG. 1A, an embodiment of the method 20 of the invention is illustrated through an operational flow chart. The method 20 is for controlling the heat-generating element 24 that generates heat when electric current is passed therethrough to control the ambient temperature within the space 26 in which the sensor 28 for sensing temperatures is at least partially located. As can be seen in FIG. 1A, the method 20 preferably begins with the sensor 28 sensing an initial temperature (step 40, FIG. 1A). Next, passage of the electric current through the heat-generating element 24 at 100 percent output is permitted for a preselected initial time period (step 42). After the electric current has passed through the heat-generating element for the preselected initial time period, a second temperature is sensed by the sensor 28 (step 44). It is also preferred that a first temperature difference (represented as "X" in FIG. 7) is determined by the microprocessor 32, between the initial temperature and) the second temperature (step 46). A calculated maximum error (represented as "D" in FIG. 7) between (i) a sensed temperature sensed at a selected time after the initial time period, and (ii) the ambient temperature at the selected time, preferably is determined by the microprocessor 32 in accordance with a predetermined relationship between the first temperature difference and the maximum error (step 48), as will be described.

Those skilled in the art would appreciate that the heat-generating element 24 may be any element that is subject to Joule heating. For illustrative purposes, the system 22 is shown and described herein as including an electric baseboard heater 34 (FIGS. 2-5) with the sensor 28 mounted on a housing 36. However, it will be understood that the invention herein may be used in any application where temperature sensing by the sensor 28 is adversely affected, directly or indirectly, by Joule heating. The system 22 is schematically illustrated in FIG. 6. As is known in the art, the electric current that passes through the heat-generating element 24 is from a source 37. It will be understood that the switch 30 is any means for controlling passage of the electric current from the source 27 to the heat-generating element 24. As will be described, the method of the invention provides for calibration of the system 22, i.e., adjustment of the maximum error (i.e., at 100 percent output) between the sensed temperature after the initial time period and the ambient temperature. Depending on the system, the maximum error thus determined (i.e., taking any changes in the environment and/or the system into account) may be utilized in various ways.

Figures 1, 1B:
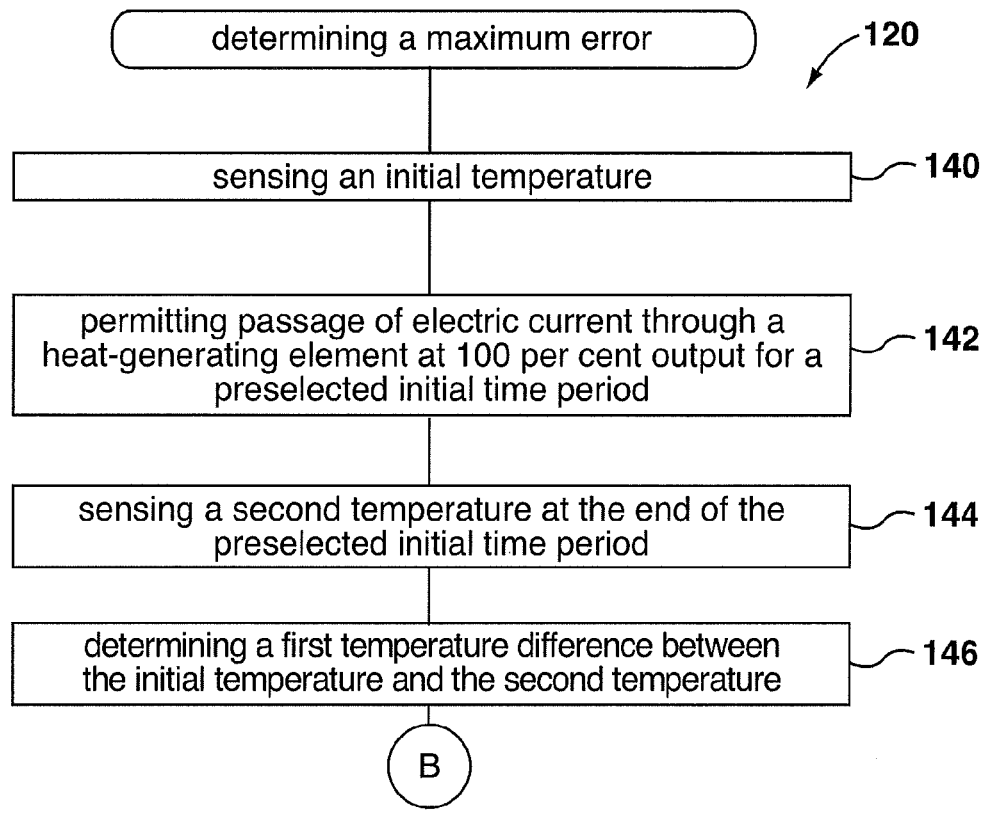
FIG. 1B-1 is a flow chart partially schematically illustrating another embodiment of the method of the invention.
Figures 1, 1B, 2:
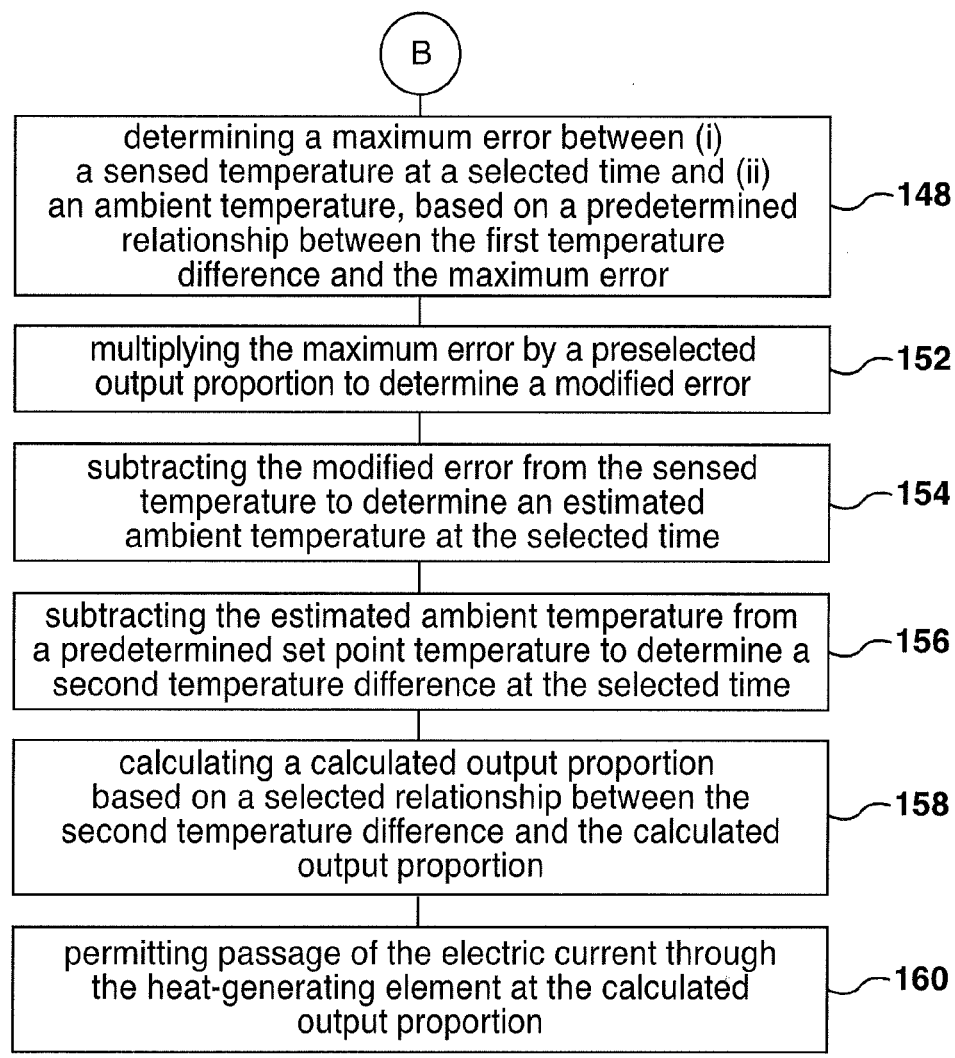

The following is one example of how the maximum error may be utilized. In FIGS. 1B-1 and 1B-2, another embodiment of the method 120 of the invention is illustrated through an operational flow chart. The method 120 is for controlling the heat-generating element 24 that generates heat when electric current is passed therethrough to control the ambient temperature within the space 26 in which the sensor 28 for sensing temperatures is at least partially located. As can be seen in FIGS. 1B-1 and 1B-2, the method 120 preferably begins with the sensor 28 sensing an initial temperature (step 140, FIG. 1B-1). Next, passage of the electric current through the heat-generating element 24 at 100 percent output is permitted for a preselected initial time period (step 142). After the electric current has passed through the heat-generating element for the preselected initial time period, a second temperature is sensed by the sensor 28 (step 144). It is also preferred that a first temperature difference (represented as "X" in FIG. 7) is determined by the microprocessor 32, between the initial temperature and the second temperature (step 146). A maximum error (represented as "D" in FIG. 7) between (i) a sensed temperature sensed at a selected time after the initial time period, and (ii) the ambient temperature at the selected time, preferably is determined by the microprocessor 32 in accordance with a predetermined relationship between the first temperature difference and the maximum error (step 148), as will be described.

Next, with the microprocessor 32, the maximum error preferably is multiplied by a preselected output proportion to determine a modified error (152). ("Output proportion" is also described further below.) It is also preferred that the modified error is then subtracted by the microprocessor 32 from the sensed temperature to determine an estimated ambient temperature at the selected time (step 154). Preferably, the estimated ambient temperature is then subtracted by the microprocessor 32 from the predetermined set point temperature to determine a second temperature difference at the selected time (step 156). In the next step, a calculated output proportion preferably is calculated (by the microprocessor 32) based on a selected relationship between the second temperature difference and the calculated output proportion, as will be described (step 158). Next, passage of the electric current through the heat-generating element 24 is permitted at the calculated output proportion (step 160).

In one embodiment, a method 220 of the invention is directed to determining a modified maximum error, as will be described. In this method, schematically illustrated in FIGS. 1C-1 and 1C-2, steps 240-246 are the same as steps 140-146 respectively, described above. However, in step 248, a calculated maximum error (represented as "D" in FIG. 7) between (i) a sensed temperature sensed at a selected time after the initial time period, and (ii) the ambient temperature at the selected time, preferably is determined by the microprocessor 32 in accordance with a predetermined relationship between the first temperature difference and the calculated maximum error. It is also preferred that a modified maximum error that is based on a preselected relationship between the calculated maximum error and the modified maximum error is determined (step 250), as will also be described. Next, with the microprocessor 32, the modified maximum error preferably is multiplied by a preselected output proportion to determine a modified error (252). ("Output proportion" is also described further below.) It is also preferred that the modified error is then subtracted by the microprocessor 32 from the sensed temperature to determine an estimated ambient temperature at the selected time (step 254). Preferably, the estimated ambient temperature is then subtracted by the microprocessor 32 from the predetermined set point temperature to determine a second temperature difference at the selected time (step 256). In the next step, a calculated output proportion preferably is determined (by the microprocessor 32), based on a selected relationship between the second temperature difference and the calculated output proportion (step 258). As will be described, the calculation of the calculated output proportion is based on a second predetermined relationship between the second temperature difference and the calculated output proportion. Next, passage of the electric current through the heat-generating element 24 is permitted at the calculated output proportion (step 260).

As is well known in the art, when the heating element 24 in the baseboard heater 34 is energized, air circulates through the housing 36 of the baseboard heater due to convection. Such air circulation is schematically indicated by arrows "A", "B" and "C" in FIGS. 2-4. As can be seen in FIGS. 3 and 4, the sensor 28 is positioned on the outside of the housing 36 in an attempt to enable the sensor to sense the temperature of the air in the space both when the heating element is energized, and otherwise.

Those skilled in the art would appreciate that the sensor 28 is affected by Joule heating, albeit indirectly. That is, when the electric current passes through the element 24 in the baseboard heater 34, a portion of the heat generated by the element 24 is transferred to the sensor 28, by conduction (i.e., from the element 24 and, via the housing 34 to the sensor 28), and also by convection. In this way, although the sensor 28 may not itself be subject to Joule heating, it is affected by the Joule heating of the element 24, to the extent that, while the electric current passes through the element 24, the temperature sensed by the sensor 28 clearly represents the ambient temperature plus an additional temperature, as represented in FIG. 7.

Figure 7:
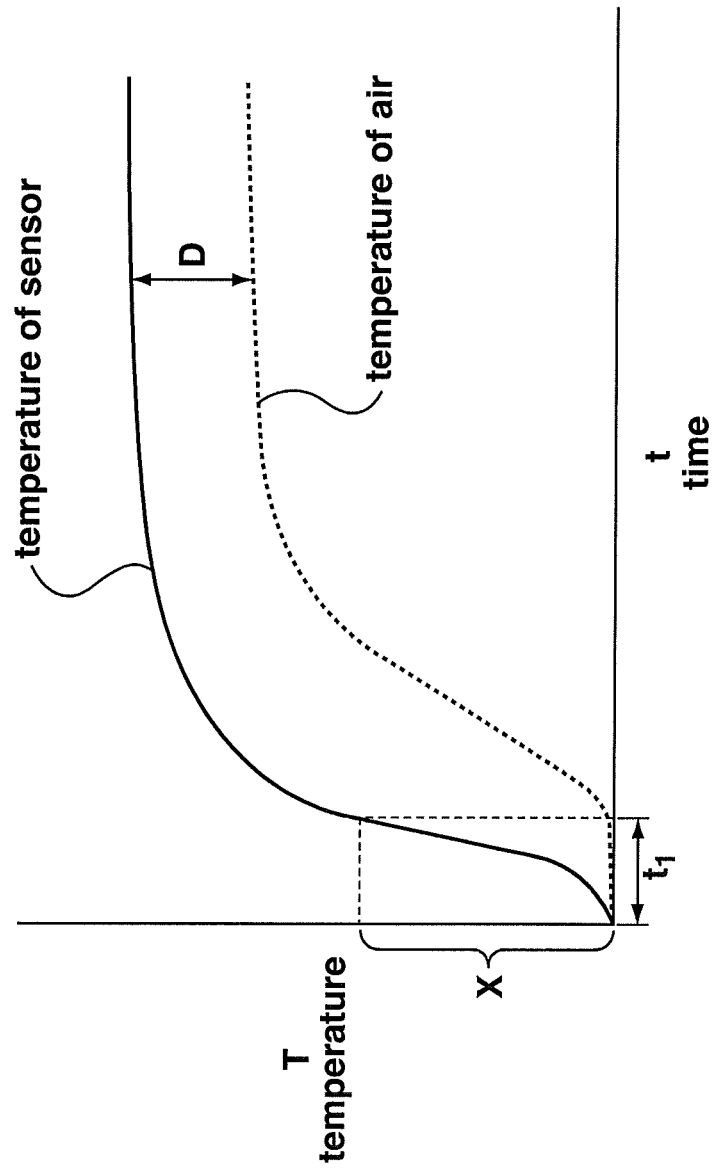
FIG. 7 is a graph generally illustrating the relationship between a first temperature difference "X" and a maximum error "D"

As can be seen in FIG. 7, there is a relationship between the first temperature difference "X" and the maximum error "D" (also referred to as the maximum offset) between the sensed temperature and the ambient temperature. That is, it has been found that the extent to which the sensor 28 is heated due to Joule heating (whether indirectly and/or directly) over an initial time period (identified as "$t_1$" in FIG. 7) before the air is substantially heated is closely related to the maximum error "D". The change in the temperature of the sensor 28 alone over the initial time period "$t_1$" is the first temperature difference, referred to as "X". Also, and as can be seen in FIG. 7, once the air in the space 26 is heated, the difference between the sensed temperature and the actual ambient temperature (where the duty cycle is 100%, identified as "D", the maximum error, or maximum offset) is substantially constant over time.

In the invention herein, the maximum error (i.e., the calculated maximum error) preferably is determined according to a predetermined relationship that is determined for a particular product. The predetermined relationship preferably represents a line of "best fit" among a relatively large number of data points. For example, in FIG. 8, results for a particular product over an extended period of time are graphically represented. It can be seen in FIG. 8 that a predetermined relationship is determinable by determining a line that fits the data points best overall.

Figure 8:
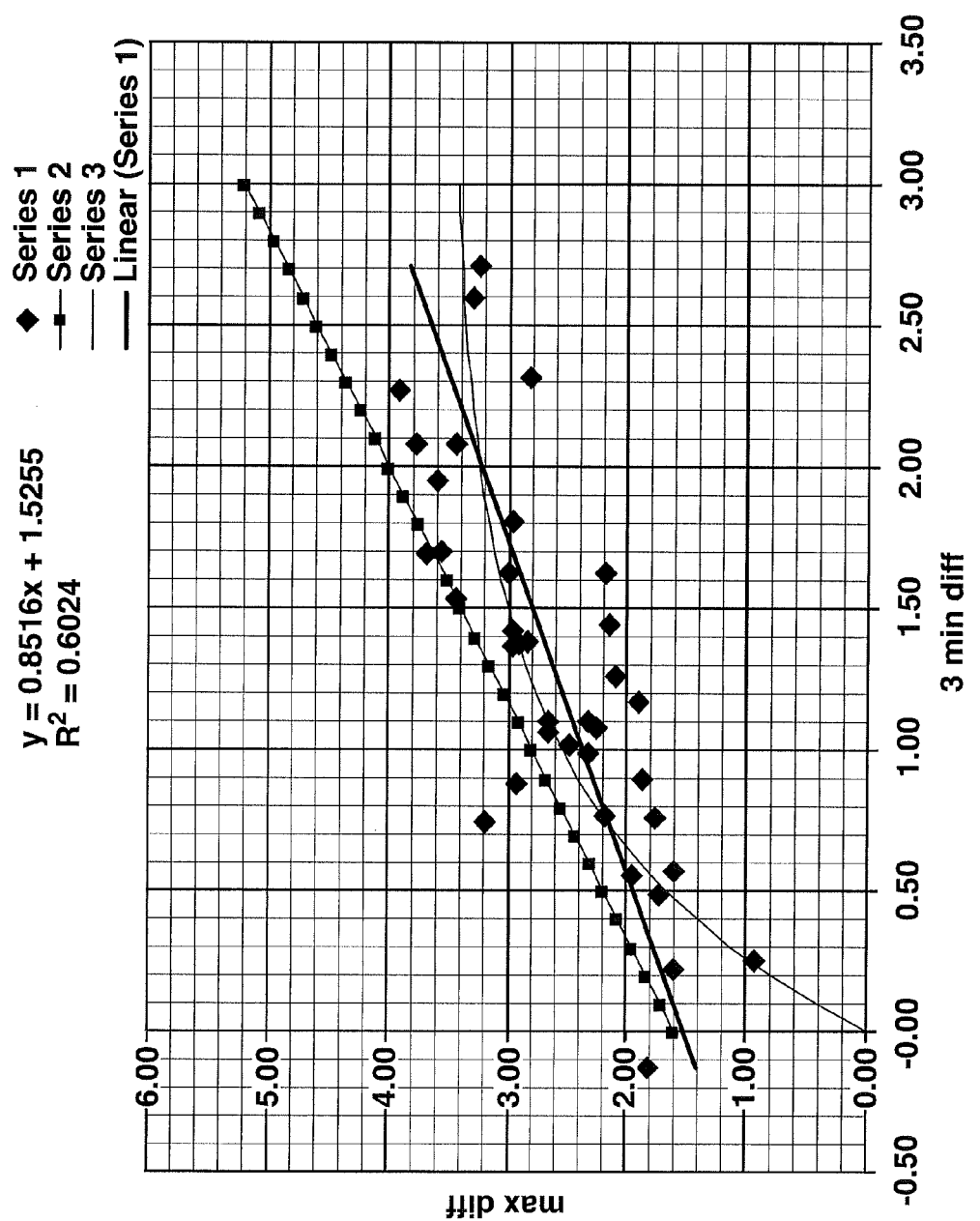
FIG. 8 is a graph of "D" as a function of "X".

It will be understood that the initial time period "$t_1$" is any appropriate time period. As described above, it is intended that the initial time period "$t_1$" is substantially concurrent with the heating of only the sensor and its immediate surroundings (i.e., due to direct or indirect Joule heating). The idea is that, ideally, the initial time period "$t_1$" ends just before the temperature of the air in the space also begins to increase, but after some heat has been transferred to the sensor and its immediate surroundings. However, those skilled in the art would appreciate that, as a practical matter, some of the air in the space is positioned immediately proximal to the heat-generating element, and proximal to the part of the housing that becomes heated during the initial time period, and also proximal to the sensor. Therefore, strictly speaking, at least a very small part of the air in the space is heated, at least to a minimal extent, during the initial time period. The initial time period therefore should be relatively short, so as to minimize the extent to which heat transfer to the air in the space occurs during the initial period. In practice, the initial time period "$t_1$" may be different relatively short time periods, and the first temperature difference "X" resulting therefrom provides a maximum error "D" that is consistent with other maximum, errors. In summary, although the initial time period "$t_1$" used in the testing that is graphically illustrated in FIG. 8 is three minutes, it has been found that shorter initial time periods (e.g., 128 seconds) may be used.

In one embodiment, the predetermined relationship preferably is a substantially linear relationship. Where the predetermined relationship is a substantially linear relationship, it is also preferred that the calculated maximum error is determined by multiplying the first temperature difference by a first predetermined constant and adding a product thereof to a second predetermined constant.

However, in the invention herein, the system is configured to be calibrated to take into account changes in the environment immediately surrounding the system, as well as changes in the system, as will be described. As described above, the calibration preferably involves a new determination of "X", a variable in the predetermined relationship, and a corresponding new calculation of "D" based on the new value of "X". In this way, the invention herein takes the environment around the system and any changes in the system into account.

As will be described, in one embodiment, the calibration is automatically initiated, i.e., calibration proceeds when all of one or more predetermined preconditions are met. In another embodiment, calibration preferably is initiated by a user, e.g., by the user moving a suitably connected switch. Where the calibration is user-initiated, such initiation may be a predetermined precondition. Those skilled in the art would appreciate that initiation of calibration may, if preferred, be automatic and/or by the user.

As described above, in one embodiment, it is preferred that the calculated maximum error is modified, to determine a modified maximum error. Preferably, the modified maximum error is determined based on a preselected relationship between the calculated maximum error and the modified maximum error. For example, the modified maximum error may be determined by averaging the calculated maximum error with a preselected maximum error value. After the system has been operating for some time; it is preferred that the preselected maximum error value is itself an average of a predetermined number of previously calculated maximum errors. For instance, the preselected maximum error value may be an average of the 15 most recently calculated maximum errors.

However, it will be understood that when the system is first operated (i.e., in the absence of data), it is necessary to assume the preselected maximum error value. For instance, the preselected maximum error value may be an average of the maximum errors found during the testing of the product type, to determine the predetermined relationship between "X" and "D".

Those skilled in the art would appreciate that the preselected relationship may be any suitable relationship.

From the foregoing, it can be seen that the invention herein does not involve or utilize a constant maximum error, or maximum offset. Instead, the maximum error is recalculated with each calibration. In this way, the environment surrounding the system is taken into account. In addition, changes in the environment, and also changes in the system, are taken into account via calibration, and recalibration.

The changes to the system may be deliberate (e.g., due to the system being moved to another room (space), or inadvertent. For example, where the system includes the baseboard heater, with the sensor mounted on the housing, there may be inadvertent changes that affect the characteristics of the system, and in particular, the sensor. If the sensor is struck (e.g., by a broom, or kicked), its position may be changed, or a protective covering around it may be bent, affecting the flow of air around the sensor. Or the baseboard may become dusty, i.e., to the extent that its performance is affected thereby. Similarly, the changes to the environment that are material may be deliberate, or inadvertent. The result is more accurate control of the system, and greater efficiency and effectiveness.

As noted above, the calculated maximum error is determined when the electric current is passed through the heat-generating element at 100 percent output. However, in order to proceed with utilizing the modified maximum error, a proportional error (i.e., the "modified error") is to be determined.

As is known in the art, the error (i.e., between the sensed temperature, and the actual ambient temperature) is proportional to the output of the system. Those skilled in the art would be aware that the output of the system may be controlled in various ways. For the purposes hereof, "output proportion" means the proportion of the maximum output that is utilized. For example, where the system 22 is controlled via duty cycles, the duty cycle (e.g., 50 percent) would be considered the output proportion. Where the system is controlled via other means (e.g., via a triac) that do not necessarily involve intermittent operation, the output proportion indicates the proportion of the maximum output that is utilized.

Because the error is proportional to the output proportion (e.g., the duty cycle), and because the maximum error is calculated at an output proportion of 100 percent, the maximum error is modified, to proportion it appropriately. The modified error is determined by multiplying the modified maximum error by a preselected output proportion, expressed as a percentage. (As described above, the modified maximum error may be an average of maximum errors, or it may be another value (e.g., mean, or mode) based on the calculated maximum error. Those skilled in the art would appreciate that the preselected relationship may be any suitable relationship.)

The preselected output proportion may be determined in any suitable manner, as would be appreciated by those skilled in the art. In one embodiment, the preselected output proportion preferably is an average of output proportions calculated over a preselected time period, e.g., the most recent 15 output proportions.

As noted above, once the second temperature difference has been determined, the calculated output proportion is determined, based on a selected relationship between the second temperature difference and the calculated output proportion. For example, in one embodiment, the microprocessor has a scaling factor associated therewith, and the calculated output proportion is determined by multiplying the second temperature difference and the scaling factor.

In one embodiment, the calibration preferably takes place automatically, e.g., when no current passes through the heat-generating element 24 for a first predetermined time period. In addition, it is also preferred that the temperatures sensed by the sensor are substantially stable for a first predetermined temperature stability check time period. The first predetermined temperature stability check time period preferably is concurrent with the first predetermined period, coterminous. For instance, in one embodiment, the first predetermined period preferably is approximately 20 minutes, and the first predetermined temperature stability check period preferably is the final five minutes of that 20-minute period.

In one embodiment, if these two preconditions are met, then the initial temperature preferably is sensed. In one embodiment, another precondition is that the initial temperature is less than the predetermined set point temperature. In this embodiment, if the initial temperature is less than the predetermined set point temperature, then calibration proceeds.

It will be understood that "substantially stable" may be defined differently, in different contexts. In one embodiment, by "stable" it is meant that the temperatures vary by no more than about 0.5° C. (+/−0.5° C.) during the first predetermined temperature stability check time period.

As noted above, in one embodiment, if these two conditions are met, then the system will automatically calibrate. This is preferred so that calibration will occur after a period of inactivity. It will be understood that, in the absence of calibration, the system preferably operates with the most recently determined maximum error, i.e., preferably, with the most recently determined modified maximum error.

In another embodiment, calibration takes place on the user's instruction. Preferably, such initiation may be by any suitable means, e.g., a control element (such as a switch) operable manually or otherwise by the user.

It is possible that one of the two preconditions which result in automatic calibration after a period of inactivity will not be met. In this situation, automatic calibration does not take place. Instead, the system preferably operates utilizing the most recently determined modified maximum error. In this embodiment, when the preconditions noted above are satisfied, automatic calibration preferably takes place.

It will be understood that one or more preconditions (i.e., including those noted above, and others) may be programmed for automatic calibration. It will also be understood that the foregoing preconditions are exemplary only.

The predetermined relationship is initially set for a particular product, and when the system is installed, the first preselected output proportion utilized is an estimated output proportion. However, after the first calculated output proportion, the preselected output proportion next used is preferably the first calculated output proportion, i.e., the output proportion calculated when the system was most recently operating.

Those skilled in the art would appreciate that control of the system 22 may be implemented using the microprocessor 32 in various arrangements. For the purposes hereof, it is understood that "microprocessor" refers to a processing core, and may be, for example, a microcontroller, or any other suitable processing unit, as would be known to those skilled in the art. Those skilled in the art would also appreciate that the microprocessor 32 preferably is included in a controller in which feedback from the process is constantly taken into account. For instance, the system may include a "PID" (proportional-integral-derivative) controller, or a "P" controller, or a "PI" controller. It is preferred that the microprocessor 32 is included in an appropriately configured PI controller. Those skilled in the art would be aware of a scaling factor that is typically associated with the microprocessor in the PI controller. Because feedback controllers and their operation are well known in the art, further description thereof is unnecessary.

INDUSTRIAL APPLICABILITY

Figures 1, 1C:
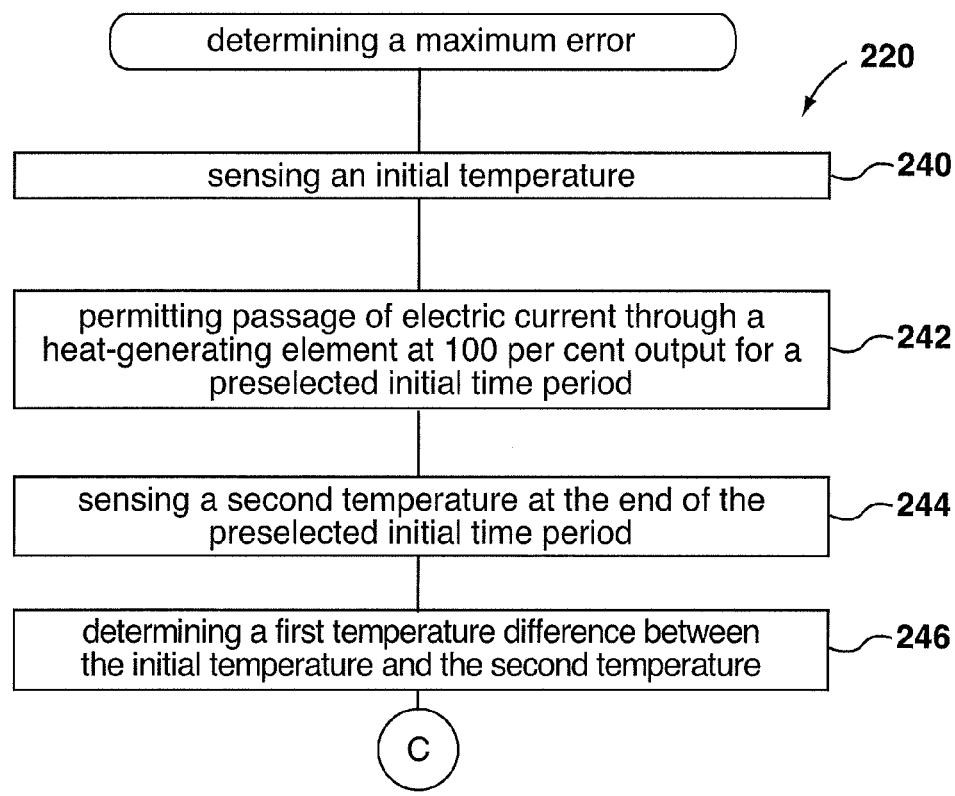
Figures 1, 1C, 2:
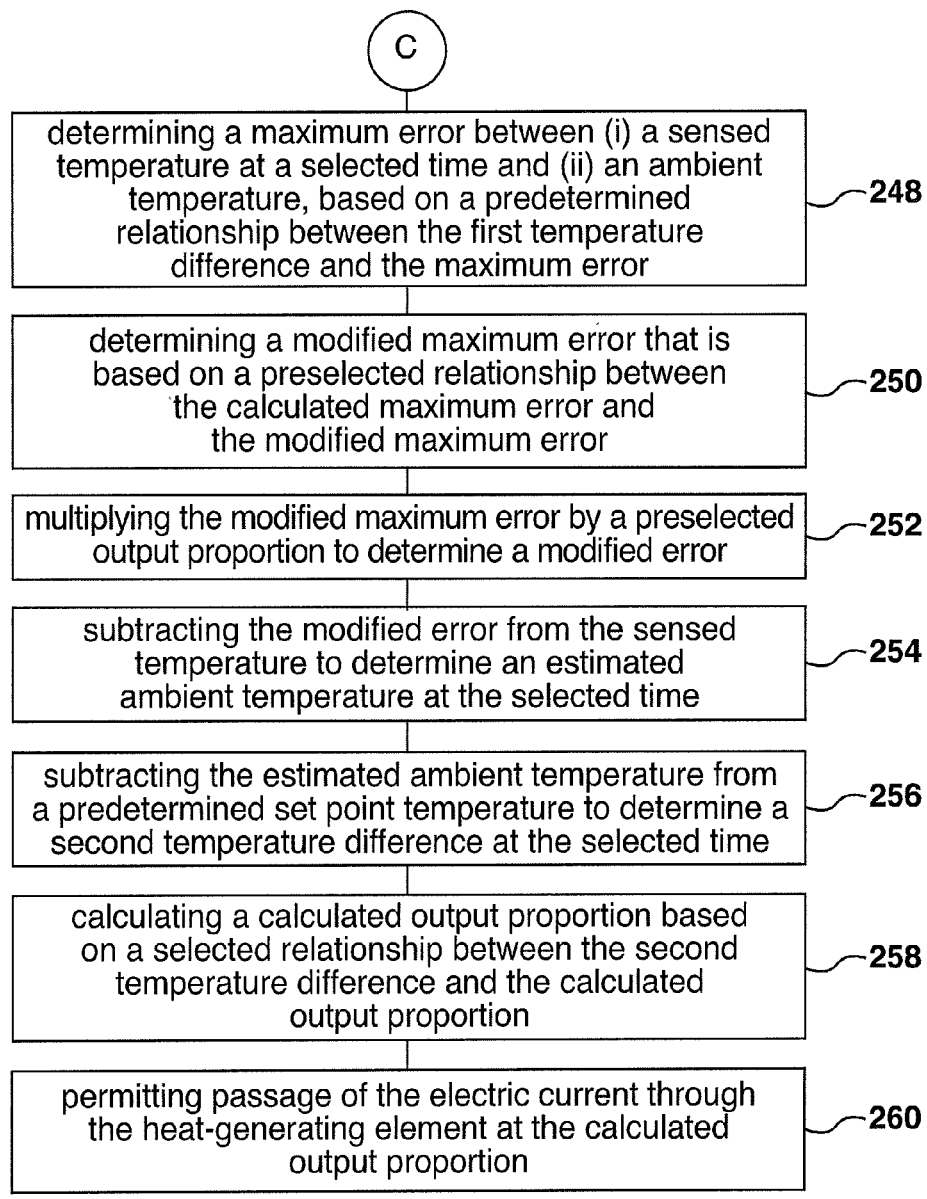

From the foregoing, it can be seen that the method of controlling the heat-generating element of the invention includes a method of calibrating. It will be understood that there are various alternative embodiments of the method of calibration of the invention herein. For instance, in one embodiment, the method 120 of calibration of the invention preferably does not include determining a modified maximum error. In FIGS. 1C-1 and 1C-2, another embodiment of a method 220 of controlling the heat-generating element 24 is illustrated through an operational flow chart, as described above.

Those skilled in the art would appreciate that, once the maximum error has been newly determined (i.e., whether modified or not), the calibration is completed. As noted above, it is expected that further calibrations will take place from time to time, whether automatically initiated or otherwise.

As noted above, the method of the invention may be used in any system where there is Joule heating that directly or indirectly affects the measurement of an ambient temperature. For exemplary purposes only, the method is described herein as being applied to control a system that heats a space.

The following is an example of the calibration sequence. In the following example, for clarity, the process as implemented using a "P" controller is set out.
Example of the Calibration Sequence
Initial Conditions:
The heater is newly installed and operated for the first time.
$T_{setpoint}$=temperature the user inputs into the heater
$T_{setpoint}$=22.0° C.
Daytime heat gain leads to room temperatures>22.0° C.
Night time heat loss requires 750W of electrical heating.
As Day Transitions to Night the Room Temperatures Drops:
$T_{sensor}$=Temperature measured by the sensor
$T_{sensor}$=21.99° C.
The controller enters the calibration cycle and operates at 100% Duty Cycle for 3 minutes (i.e., "$t_1$") and the change in temperature (i.e., the first temperature difference) is measured ("X").
X=1° C.
D=X*1.2+1.6=2.8° C.
$D_{average}$=the average of the last 16 measurements of D, in this case only the default value of 2.5° C. is used.
$D_{average}$=2.7° C.
Throughout the Night a 1500 W Heater Operates as Follows:
Duty Cycle=Error*scaling factor
Duty Cycle=the fraction of heater on time over a 128 second period.
scaling factor=5
$T_{sensor}$=23.35° C.
$T_{room}$=$t_{sensor}$−$D_{average}$*(Duty $Cycle_{average}$)
$T_{room}$=23.25−2.7*(50%)=21.9° C.
Duty $Cycle_{average}$=The average of the last 30 minutes of duty cycles
Duty $Cycle_{average}$=50%
Error=$T_{setpoint}$−$T_{room}$
Error=22.0−21.9=0.1
Duty Cycle=0.1*5=50%

Figures 1, 1D:
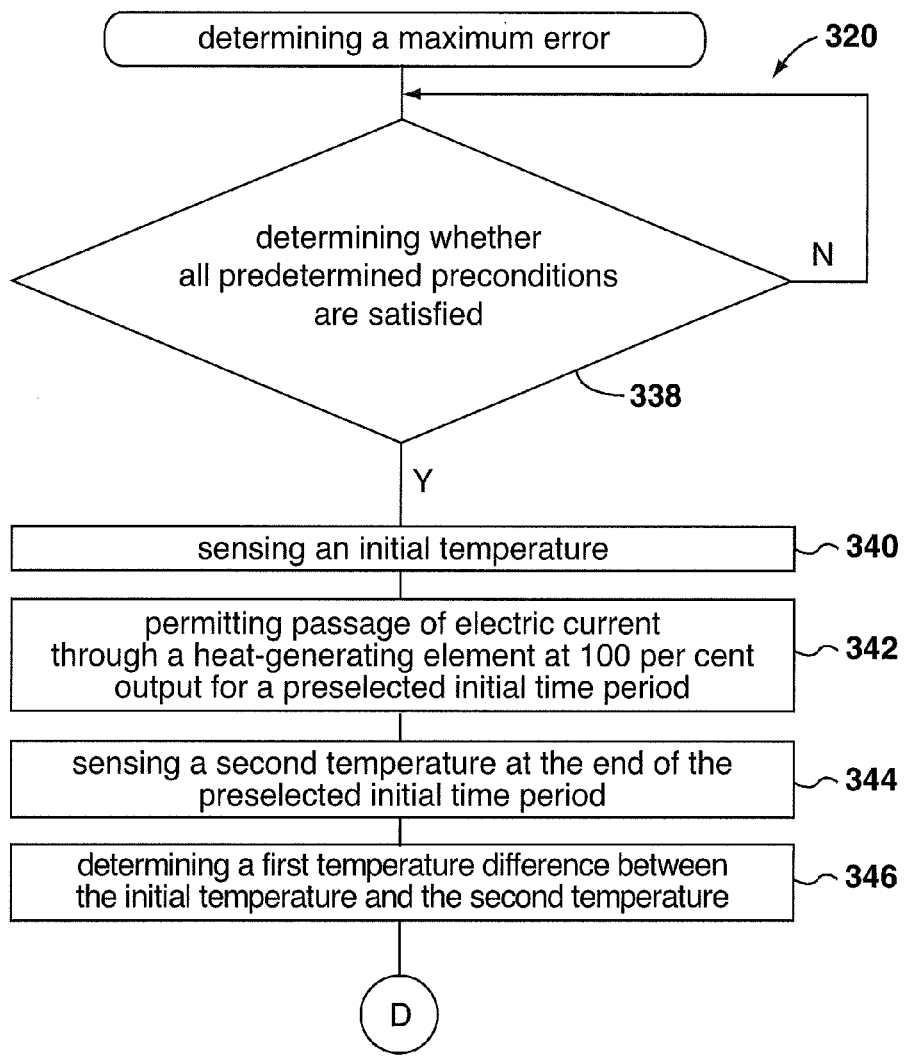
Figures 1, 1D, 2:
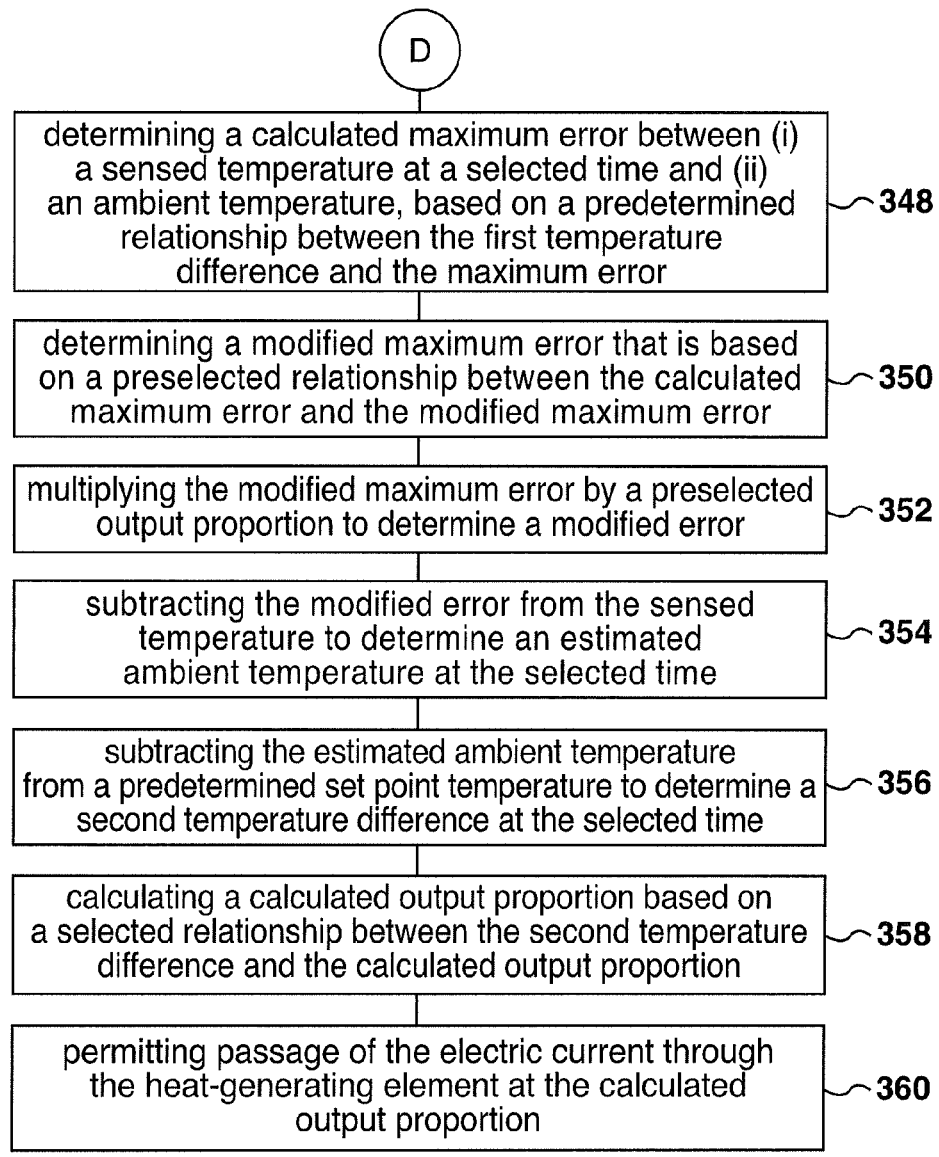

As described above, in one embodiment, calibration preferably commences when all of one or more predetermined conditions are met. In FIGS. 1D-1 and 1D-2, another embodiment of a method 320 of the invention is schematically illustrated. Preferably, the method 320 begins with determining whether all predetermined preconditions are satisfied (step 338, FIG. 1D-1). If so, then the process proceeds with sensing an initial temperature (step 340). Next, the electric current preferably is permitted to pass through the heat-generating element at 100 percent duty cycle for a preselected initial time period ("$t_1$") (step 342). A second temperature is sensed at the end of the initial time period (step 344). The first temperature difference between the initial temperature and the second temperature preferably is determined (step 346). Preferably, a calculated maximum error between (i) a sensed temperature at a selected time and (ii) an ambient temperature is determined based on a predetermined relationship between the first temperature difference ("X") and the calculated maximum error ("D") (step 348). A modified maximum error preferably is determined, the modified maximum error being based on a preselected relationship between the calculated maximum error and the modified maximum error (step 350). The average maximum error preferably is multiplied by a preselected output proportion to determine a modified error (step 352). Next, the modified error preferably is subtracted from the sensed temperature to determine an estimated ambient temperature at the selected time (step 354). The estimated ambient temperature preferably is subtracted from the set point temperature to determine a second temperature difference at the selected time (step 356). A calculated output proportion is calculated based on the second temperature difference (step 358). For instance, the calculated output proportion may be calculated by multiplying a second temperature difference by the scaling factor. Finally, passage of the electric current through the heat-generating element at the calculated output proportion is permitted (step 360).

Figures 1, 1E:
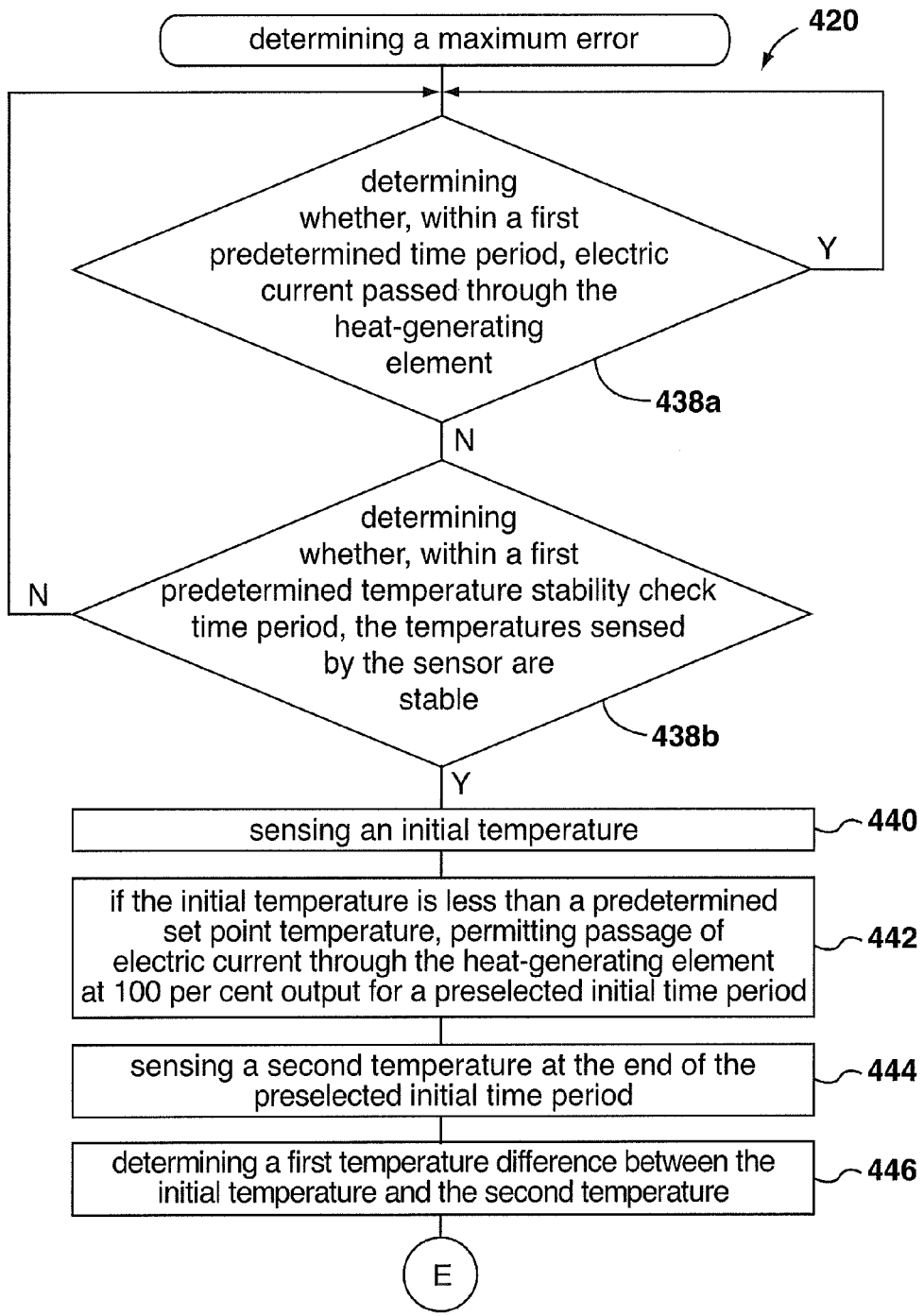
Figures 1, 1E, 2:
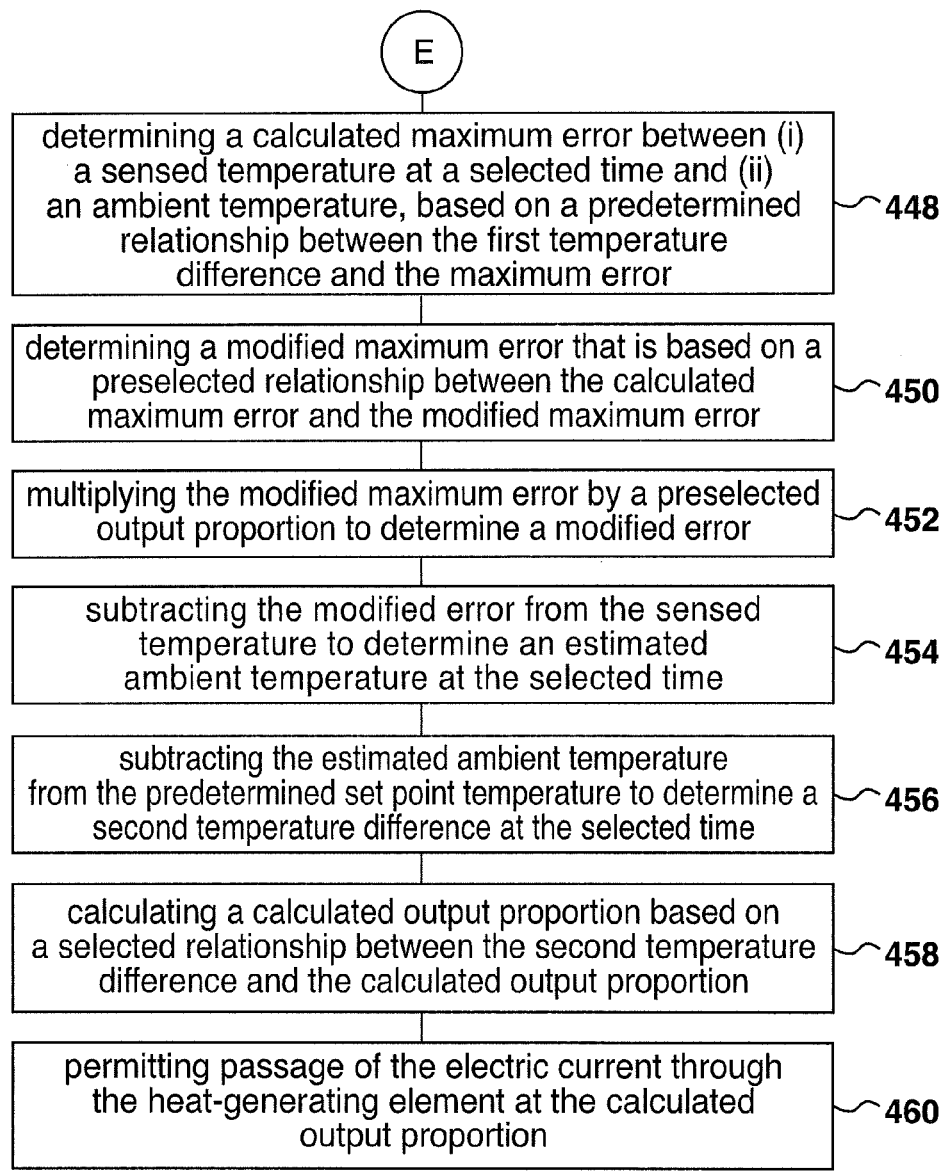
Figure 2:
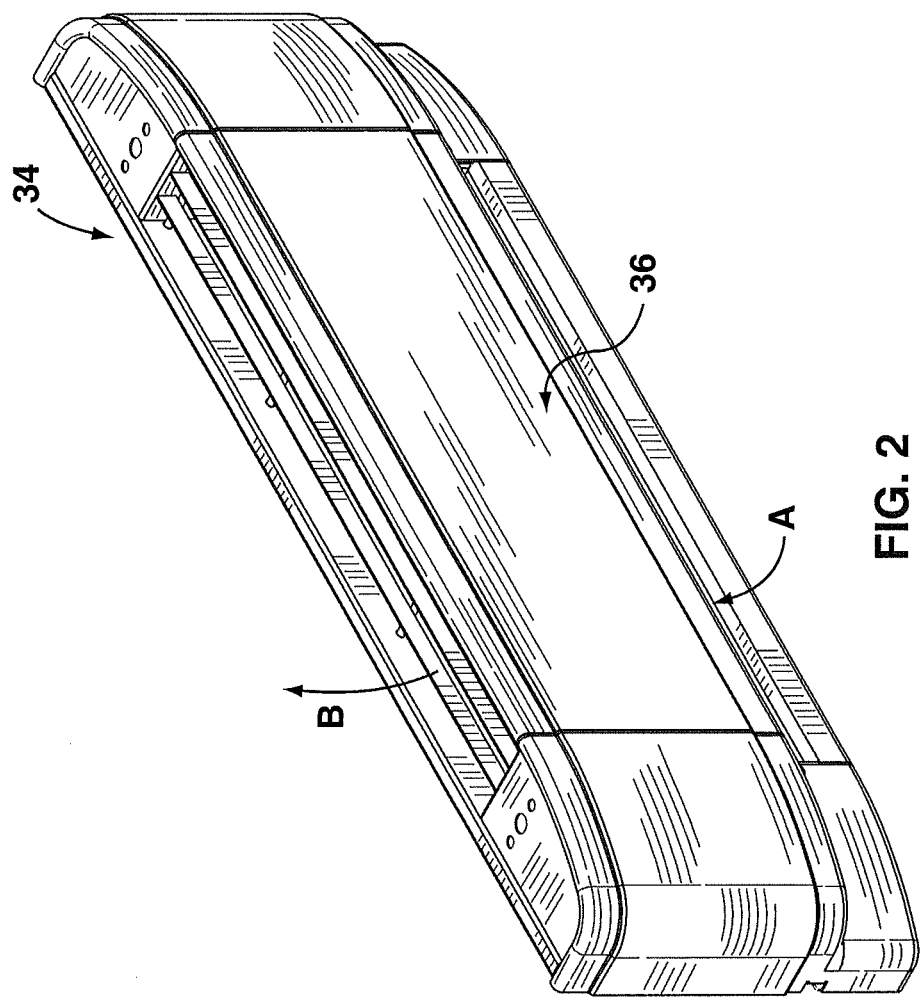
Figure 5:
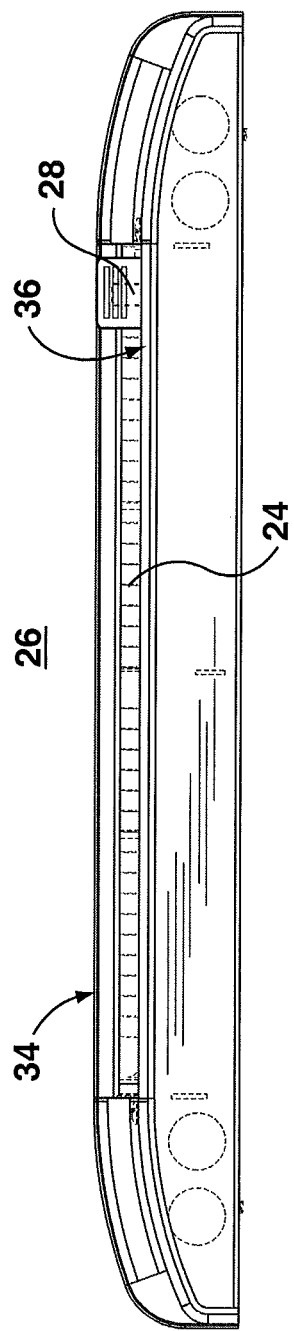
FIG. 5 is a bottom view of the baseboard heater of FIG. 2.

In another embodiment of a method 420 of the invention, three predetermined conditions are to be met before an automatic calibration process begins. The method 420 is schematically illustrated in FIGS. 1E-1 and 1E-2. Preferably, the method 420 begins with determining whether, during the first predetermined time period, the electric current passed through the heat-generating element (step 438a, FIG. 1E-1). In addition, it is also determined whether, during a first predetermined temperature stability check time period concurrent with and at an end of the first predetermined time period, the temperature sensed by the sensor are stable (step 438b). (It will be appreciated by those skilled in the art that, although step 438a is shown as preceding step 438b in FIG. 1E-1, the steps are, at least in part, concurrent, as described above.) If both of these conditions are met— that is, if the electric current has not passed through the heat-generating element during the first predetermined time period and if the temperatures sensed by the sensor during the first predetermined temperature stability check time period are substantially stable—then an initial temperature is sensed (step 440). As can be seen in FIG. 1E-1, if either of the aforesaid two conditions is not met, then automatic calibration does not commence, and the process of determining whether the two conditions are satisfied is recommenced. Next, it is preferred that, if the initial temperature is less than a set point temperature, then passage of the electric current through the heat-generating element at 100 percent output for a preselected initial time period is permitted (step 442). After the electric current has passed through the heat-generating element for the preselected initial time period, a second temperature is sensed by the sensor (step 444). In the next step, a first temperature difference preferably is determined between the initial temperature of the sensor and the second temperature (step 446). Preferably, a calculated maximum error is determined between (i) a sensed temperature of the space sensed at a selected time after the initial time period, and (ii) the ambient temperature at the selected time, in accordance with a predetermined relationship between the first temperature difference and the calculated maximum error (step 448). Next, it is preferred that a modified maximum error that is based on a preselected relationship between the calculated maximum error and the modified maximum error is determined (step 450). Preferably, the modified maximum error is then multiplied by a preselected output proportion to determine a modified error (step 452). It is also preferred that the modified error is then subtracted from the sensed temperature to determine an estimated ambient temperature at the selected time (step 454). The estimated ambient temperature is then subtracted from the set point temperature to determine a second temperature difference at the selected time (step 456).

It will be understood that, once the second temperature difference has been determined, depending on the system, various calculations may be done. In one embodiment, a calculated output proportion is calculated based on the second temperature difference, as described above (step 458). Finally passage of the electric current through the heat-generating element at the calculated output proportion is permitted (step 460).

An embodiment of the system 22 for controlling an ambient temperature within the space 26 is schematically illustrated in FIG. 6. It is preferred that the system 22 includes the heat-generating element 24 that generates heat when electric current is passed therethrough and the sensor 28 at least partially located in the space, for sensing temperatures. The system 22 preferably also includes the switch 30 to control passage of the electric current through the heat-generating element and the microprocessor 32 configured to open and close the switch. From the foregoing description, it can be seen that the microprocessor is configured to initiate calibration of the system by causing the sensor to sense an initial temperature. The microprocessor is further configured to permit the electric current to pass through the heat-generating element at 100 percent output for a preselected initial time period. The sensor is further configured to sense a second temperature, after an initial time period of the first operating time period. The microprocessor is further configured:

to subtract the initial temperature from the second temperature, to determine a first temperature difference;
to determine a maximum error between:
    a sensed temperature of the space, sensed at a selected time after the initial time period,
    the ambient temperature at the selected time,
    the maximum error being determined according to a predetermined relationship between the first temperature difference and the maximum error;
to determine a modified offset, by multiplying the maximum error by a preselected output proportion;
to determine an estimated ambient temperature at the selected time, by subtracting the modified offset from the sensed temperature;
to determine a second temperature difference at the selected time, by subtracting the estimated ambient temperature from the set point temperature;
to calculate a calculated output proportion based on the second temperature difference; and
to permit passage of the electric current through the heat-generating element at the calculated output proportion.

As can be seen in FIG. 6, the sensor, the microprocessor, and the switch may be included in a controller assembly 64. The controller assembly 64 can be installed on a product including the heat-generating element 24.

Any element in a claim that does not explicitly state "means for" performing a specific function, or "step for" performing a specific function, is not to be interpreted as a "means" or "step" clause as specified in 35 U.S.C. s.112, paragraph 6.

It will be appreciated by those skilled in the art that the invention can take many forms, and that such forms are within the scope of the invention as described above. The foregoing descriptions are exemplary, and their scope should not be limited to the preferred versions provided therein.

We claim:

1. A method of controlling a heat-generating element that generates heat when electric current is passed therethrough to control an ambient temperature within a space in which a sensor for sensing temperatures is at least partially located, the method comprising:
(a) sensing an initial temperature;
(b) permitting passage of the electric current through the heat-generating element at a preselected output for a preselected initial time period;
(c) after the electric current has passed through the heat-generating element for the preselected initial time period, sensing a second temperature;
(d) determining a first temperature difference between the initial temperature and the second temperature; and
(e) determining a maximum error between:
    a sensed temperature sensed at a selected time after the initial time period, and
    the ambient temperature at the selected time, in accordance with a predetermined relationship between the first temperature difference and the maximum error.

2. The method according to claim 1 in which the preselected output is 100 percent output.

3. The method according to claim 1 additionally comprising:
   (f) multiplying the maximum error by a preselected output proportion to determine a modified error;
   (g) subtracting the modified error from the sensed temperature to determine an estimated ambient temperature at the selected time;
   (h) subtracting the estimated ambient temperature from a predetermined set point temperature to determine a second temperature difference at the selected time; and
   (i) calculating a calculated output proportion based on a selected relationship between the second temperature difference and the calculated output proportion.

4. The method according to claim 3 additionally comprising:
   (j) permitting passage of the electric current through the heat-generating element at the calculated output proportion.

5. The method according to claim 1 in which the predetermined relationship is a substantially linear relationship.

6. The method according to claim 5 in which the calculated maximum error is determined by multiplying the first temperature difference by a first predetermined constant and adding a product thereof to a second predetermined constant.

7. The method according to claim 1 additionally comprising, prior to step (a) thereof:
   (a.1) determining whether at least one predetermined precondition is satisfied; and
   (a.2) if said at least one predetermined precondition is satisfied, proceeding with step (a).

8. The method according to claim 2 in which, in step (b), passage of the electric current at 100 percent output is permitted only if the initial temperature is less than a preselected set point temperature.

9. The method according to claim 1 additionally comprising, prior to step (a) thereof:
   (a.1) determining whether, within a first predetermined time period, the electric current passed through the heat-generating element; and
   (a.2) if the electric current has not passed through the heat-generating element during the first predetermined time period, proceeding with step (a).

10. The method according to claim 1 additionally comprising, prior to step (a) thereof:
    (a.1) determining whether, during a first predetermined temperature stability check time period, the temperatures sensed by the sensor are substantially stable; and
    (a.2) if the temperatures sensed by the sensor during the first predetermined temperature stability time check period are substantially stable, proceeding with step (a).

11. The method according to claim 1 additionally comprising, prior to step (a) thereof:
    (a.1) determining whether, within a first predetermined time period, the electric current passed through the heat-generating element;
    (a.2) determining whether, during a first predetermined temperature stability check time period concurrent and coterminous with the first predetermined time period, the temperatures sensed by the sensor are substantially stable; and
    (a.3) if the electric current has not passed through the heat-generating element during the first predetermined time period and if the temperatures sensed by the sensor during the first predetermined temperature stability check time period are substantially stable, proceeding with step (a).

12. A method of controlling a heat-generating element that generates heat when electric current is passed therethrough to control an ambient temperature within a space in which a sensor for sensing temperatures is at least partially located, the method comprising:
    (a) sensing an initial temperature;
    (b) permitting passage of the electric current through the heat-generating element at a preselected output for a preselected initial time period;
    (c) after the electric current has passed through the heat-generating element for the preselected initial time period, sensing a second temperature;
    (d) determining a first temperature difference between the initial temperature and the second temperature; and
    (e) determining a calculated maximum error between:
        a sensed temperature sensed at a selected time after the initial time period, and
        the ambient temperature at the selected time,
    in accordance with a predetermined relationship between the first temperature difference and the calculated maximum error.

13. The method according to claim 12 in which the preselected output is 100 percent output.

14. The method according to claim 12 additionally comprising:
    (f) determining a modified maximum error that is based on a preselected relationship between the calculated maximum error and the modified maximum error.

15. The method according to claim 14 additionally comprising:
    (g) multiplying the maximum error by a preselected output proportion to determine a modified error;
    (h) subtracting the modified error from the sensed temperature to determine an estimated ambient temperature at the selected time;
    (i) subtracting the estimated ambient temperature from a predetermined set point temperature to determine a second temperature difference at the selected time; and
    (j) calculating a calculated output proportion based on a selected relationship between the second temperature difference and the calculated output proportion.

16. The method according to claim 15 additionally comprising:
    (k) permitting passage of the electric current through the heat-generating element at the calculated output proportion.

17. A method of controlling a heat-generating element that generates heat when electric current is passed therethrough to control an ambient temperature within a space in which a sensor for sensing temperatures is at least partially located, the method comprising:
    (a) determining whether at least one predetermined precondition is satisfied;
    (b) if said at least one predetermined precondition is satisfied, sensing an initial temperature;
    (c) permitting passage of the electric current through the heat-generating element at a preselected output for a preselected initial time period;
    (d) after the electric current has passed through the heat-generating element for the preselected initial time period, sensing a second temperature;
    (e) determining a first temperature difference between the initial temperature and the second temperature; and (f) determining a calculated maximum error between:
a sensed temperature sensed at a selected time after the initial time period, and
the ambient temperature at the selected time,
in accordance with a predetermined relationship between the first temperature difference and the calculated maximum error.

18. The method according to claim 17 in which the preselected output is 100 percent output.

19. The method according to claim 17 additionally comprising:
(g) determining a modified maximum error that is based on a preselected relationship between the calculated maximum error and the modified maximum error.

20. The method according to claim 19 additionally comprising:
(h) multiplying the modified maximum error by a preselected output proportion to determine a modified error;
(i) subtracting the modified error from the sensed temperature to determine an estimated ambient temperature at the selected time;
(j) subtracting the estimated ambient temperature from a predetermined set point temperature to determine a second temperature difference at the selected time; and
(k) calculating a calculated output proportion based on a selected relationship between the second temperature difference and the calculated output proportion.

21. The method according to claim 20 additionally comprising:
(l) permitting passage of the electric current through the heat-generating element at the calculated output proportion.

22. A method of controlling a heat-generating element that generates heat when electric current is passed therethrough to control an ambient temperature within a space in which a sensor for sensing temperatures is at least partially located, the method comprising:
(a) determining whether, during a first predetermined time period, the electric current passed through the heat-generating element;
(b) determining whether, during a first predetermined temperature stability check time period concurrent and coterminous with the first predetermined time period, the temperatures sensed by the sensor are substantially stable;
(c) if the electric current has not passed through the heat-generating element during the first predetermined time period and if the temperatures sensed by the sensor during the first predetermined temperature stability check time period are substantially stable, sensing an initial temperature;
(d) if the initial temperature is less than a set point temperature, with a microprocessor, permitting passage of the electric current through the heat-generating element at a preselected output for a preselected initial time period;
(e) after the electric current has passed through the heat-generating element for the preselected initial time period, sensing a second temperature;
(f) determining a first temperature difference between the initial temperature of the sensor and the second temperature thereof; and
(g) determining a calculated maximum error between:
a sensed temperature of the space sensed at a selected time after the initial time period, and
the ambient temperature at the selected time,
in accordance with a predetermined relationship between the first temperature difference and the calculated maximum error.

23. The method according to claim 22 in which the preselected output is 100 percent output.

24. The method according to claim 22 additionally comprising:
(h) determining a modified maximum error that is based on a preselected relationship between the calculated maximum error and the modified maximum error.

25. The method according to claim 24 additionally comprising:
(i) multiplying the modified maximum error by a preselected output proportion to determine a modified error;
(j) subtracting the modified error from the sensed temperature to determine an estimated ambient temperature at the selected time;
(k) subtracting the estimated ambient temperature from the set point temperature to determine a second temperature difference at the selected time;
(l) calculating a calculated output proportion based on a selected relationship between the second temperature difference and the calculated output proportion; and
(m) permitting passage of the electric current through the heat-generating element at the calculated output proportion.

26. A system for controlling an ambient temperature within a space, the system comprising:
a heat-generating element that generates heat when electric current is passed therethrough;
a sensor at least partially located in the space, for sensing temperatures;
a microprocessor configured to initiate calibration of the system by causing the sensor to sense an initial temperature;
the microprocessor being configured to permit the electric current to pass through the heat-generating element at a preselected output for a preselected initial time period;
the microprocessor being further configured to cause the sensor to sense a second temperature, when the initial time period ends;
the microprocessor being further configured:
to determine a first temperature difference between the initial temperature and the second temperature; and
to determine a maximum error between:
a sensed temperature of the space, sensed at a selected time after the initial time period,
the ambient temperature at the selected time,
the maximum error being determined according to a predetermined relationship between the first temperature difference and the maximum error.

27. A system for controlling an ambient temperature within a space, the system comprising:
a heat-generating element that generates heat when electric current is passed therethrough;
a sensor at least partially located in the space, for sensing temperatures;
a microprocessor configured to initiate calibration of the system by determining whether, during a first predetermined time period, the electric current passed through the heat-generating element;
the microprocessor being further configured to determine whether, during a first predetermined temperature stability check time period concurrent and coterminous with the first predetermined time period, the temperatures sensed by the sensor are substantially stable;

the microprocessor being further configured, if the electric current does not pass through the heat-generating element during the first predetermined time period and if the temperatures sensed by the sensor during the first predetermined temperature stability check time period are substantially stable, to cause the sensor to sense an initial temperature;

the microprocessor being configured, if an initial temperature is less than a preselected set point temperature, to permit the electric current to pass through the heat-generating element at a preselected output for a preselected initial time period;

the microprocessor being further configured to cause the sensor to sense a second temperature when the initial time period ends;

the microprocessor being further configured:
to determine a first temperature difference between the initial temperature and the second temperature;
to determine a calculated maximum error between:
a sensed temperature of the space, sensed at a selected time after the initial time period,
the ambient temperature at the selected time,
the calculated maximum error being determined according to a predetermined relationship between the first temperature difference and the calculated maximum error;
to determine a modified maximum error that is based on a preselected relationship between the calculated maximum error and the modified maximum error;
to determine a modified offset, by multiplying the modified maximum error by a preselected output proportion;
to determine an estimated ambient temperature at the selected time, by subtracting the modified offset from the sensed temperature;
to determine a second temperature difference at the selected time, by subtracting the estimated ambient temperature from the set point temperature;
to calculate a calculated output proportion based on a selected relationship between the second temperature difference and the calculated output proportion; and
permitting passage of the electric current through the heat-generating element at the calculated output proportion.

28. The system according to claim 27 in which the microprocessor is configured to calculate the calculated output proportion by multiplying the second temperature difference by a scaling factor associated with the microprocessor.

29. A controller assembly for controlling a heat-generating element that generates heat when electric current is passed therethrough to control an ambient temperature within a space, the controller assembly comprising:
a sensor at least partially located in the space, for sensing temperatures;
a microprocessor configured to initiate calibration of the system by causing the sensor to sense an initial temperature;
the microprocessor being configured to permit the electric current to pass through the heat-generating element at a preselected output for a preselected initial time period;
the microprocessor being further configured to cause the sensor to sense a second temperature, when the initial time period ends;
the microprocessor being further configured:
to determine a first temperature difference between the initial temperature and the second temperature; and
to determine a maximum error between:
a sensed temperature of the space, sensed at a selected time after the initial time period,
the ambient temperature at the selected time,
the maximum error being determined according to a predetermined relationship between the first temperature difference and the maximum error.

* * * * *